Dec. 17, 1929.  N. A. CHRISTENSEN  1,739,783
VEHICLE BRAKE APPARATUS
Filed March 26, 1926   2 Sheets-Sheet 2
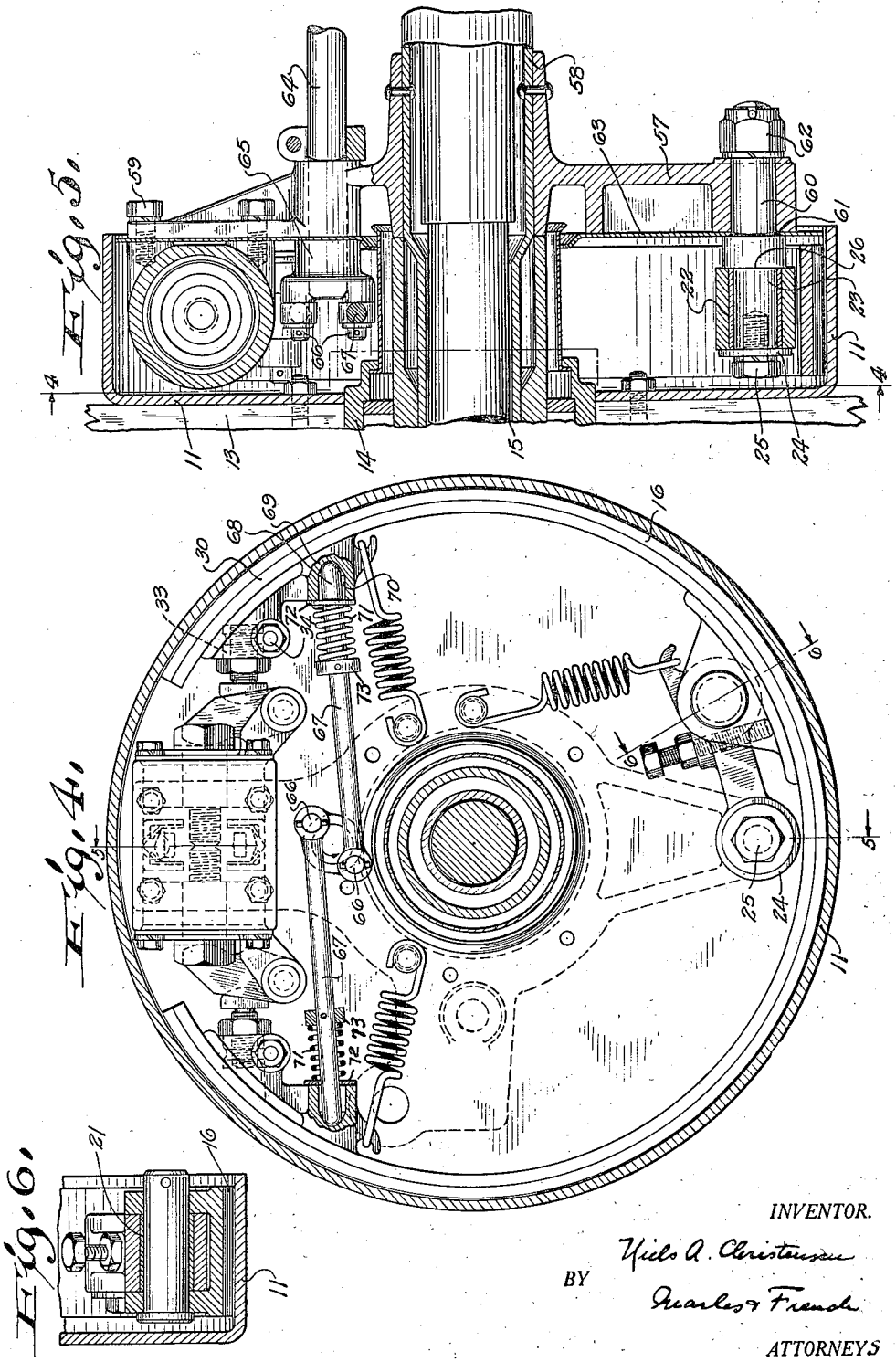
INVENTOR.
Niels A. Christensen
BY
Charles French
ATTORNEYS Patented Dec. 17, 1929

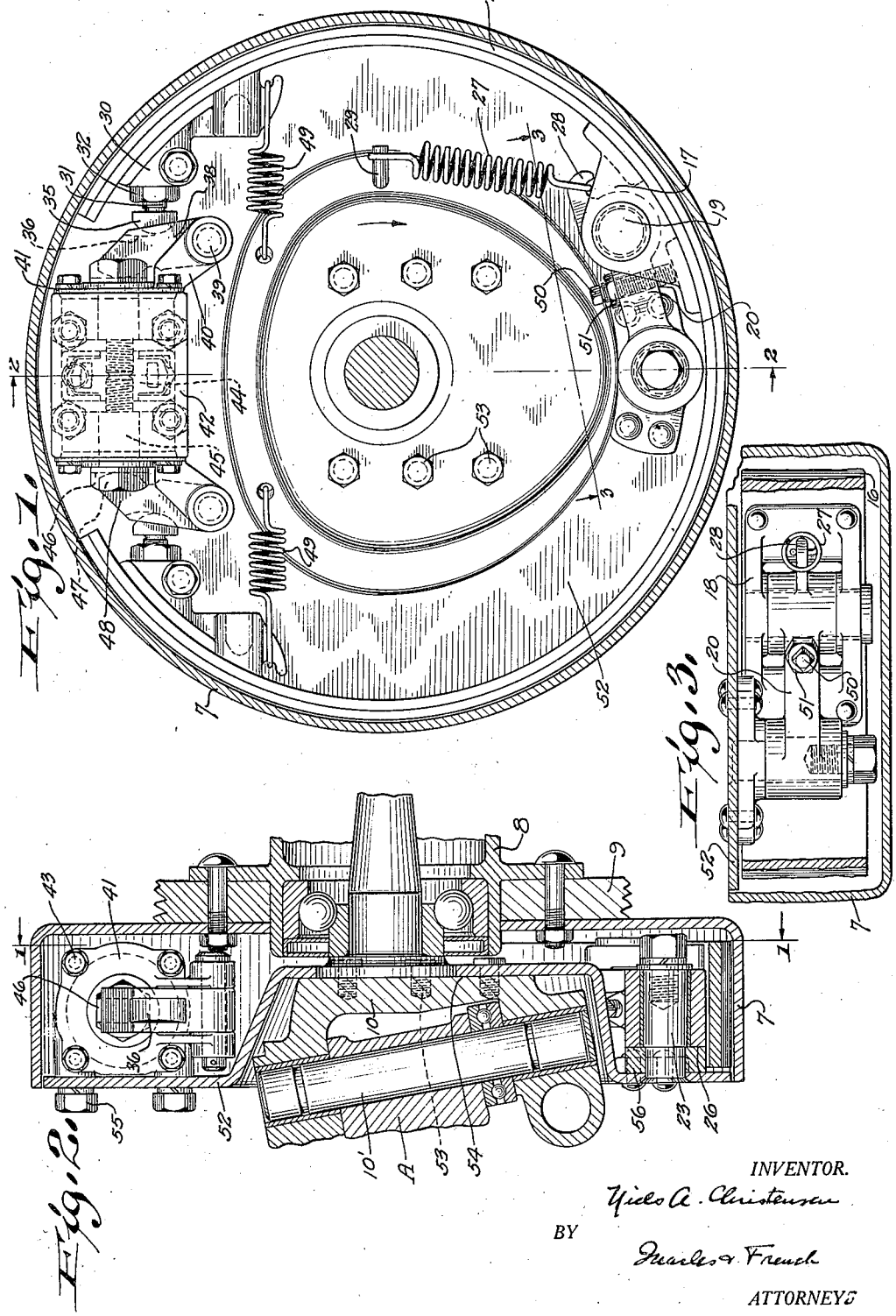

1,739,783

UNITED STATES PATENT OFFICE

NIELS A. CHRISTENSEN, OF CLEVELAND, OHIO

VEHICLE BRAKE APPARATUS

Application filed March 26, 1926. Serial No. 97,663.

The invention relates to vehicle brakes for automotive vehicles and trailers for such vehicles.

The object of the invention is to provide a brake mechanism in which a medially pivoted and supported brake band is associated with the brake drum and is moved to application position by the powerful braking force exerted by a fluid-pressure-operated motor and the leverage connection between said motor and said band.

A further object of the invention is to provide brake mechanism of the character above described in which provision is made for a manual application of the brake band independent of the fluid-pressure-operated motor by means acting on the same ends of the band as said motor.

The invention further consists in the several features hereinafter set forth and more particularly defined by claims at the conclusion hereof.

In the drawings Fig. 1 is a sectional view of brake mechanism embodying the invention disposed within the brake drum and viewed along the section line 1—1 of Fig. 2 where the brake mechanism is associated with the front wheel;

Fig. 2 is a section taken on the line 2—2 of Fig. 1;

Fig. 3 is a detail sectional view taken on the line 3—3 of Fig. 1;

Fig. 4 is a sectional view similar to Fig. 1 showing brake mechanism embodying the invention associated with one of the rear wheels, the section being taken along the line 4—4 of Fig. 5;

Fig. 5 is a section taken on the line 5—5 of Fig. 4;

Fig. 6 is a detail sectional view taken on the line 6—6 of Fig. 4.

In Figs. 1 to 3, inclusive, of the drawings, the numeral 7 indicates the brake drum for the front wheel, suitably bolted to the hub 8 and spokes 9 of said wheel, the hub 8 being journalled on the stub axle formed integral with the steering knuckle 10. In Figs. 4 to 6, inclusive, the numeral 11 indicates the brake drum for one of the rear wheels which is secured by bolts 12 to the spokes 13 and a part 14 of the hub of said wheel which is mounted in known manner on the rear axle 15.

A brake band 16 is shown in connection with both of the structures and is the same for each, and in each case the medial portion of said band is provided with a lug 17 having spaced ears 18 in which an anchor pin 19 is mounted. An anchor pin link 20 has an opening at one end provided with a bushing 21 through which the pin 19 passes. The other end of said link is apertured and provided with a bushing 22 fitting over a pin 23 and held against lateral movement thereon by a washer 24 associated with a bolt 25 at one end of said pin and a shouldered portion 26 at the other end of the pin. In each instance the pin 23 is suitably supported, as hereinafter specifically described, upon a part fixed against rotation, whereby the brake band 16 is medially and pivotally supported by the link 20. In each instance this band is normally held in a release position by means of a spring 27 connected at one end to a lug 28 on the link, and at the other end to a pin 29 associated with the brake support.

Each of the free ends of the band has a lug member 30 in which an abutment in the form of a jack-screw 31 is adjustably mounted and secured through a nut 32 and a bushing 33 associated with said screw and mounted in a split portion of said lug, the split parts of which are clamped together by a bolt 34, as more particularly shown and described in my copending application Serial No. 703,952, filed April 3, 1924. The jack-screw 31 has a flattened head 35 which works in a slot 36 in the intermediate part of a lever 38. Each of the levers 38 is pivotally mounted at one of its ends on a pin 39 carried by spaced ears 40 formed integral with the end cover 41 of the fluid-pressure-operated motor which includes the brake cylinder 42.

The heads or covers 41 are suitably secured to the brake cylinder by bolts 43. A pair of suitably packed pistons 44 work in the brake cylinder and are provided with piston- or thrust-rods 45 having polygonal heads 46 at their outer ends which are provided with slots 47 in which the outer or free ends 48 of the levers 38 work. The slots 36 and 47 being parallel to the plane of the drum serve to hold the band in alinement with said drum and prevent lateral movement relative thereto.

With this construction introduction of fluid pressure into the brake cylinder 44, in the space between the pistons, causes said pistons to move outwardly and hence their thrust-rods move outwardly, swinging the levers 38 outwardly and thus, through their connection with the abutment 31, forcing the free ends of the band 16 into engagement with the drum, such action also causing the intermediate portion of the band to move into engagement with the drum, the swinging of the link 20 permitting of this motion, the braking force being multiplied by the leverage system shown.

Upon the release of pressure from the brake cylinder the spring 27 moves the intermediate part of the band out of engagement with the drum, and springs 49, each respectively associated with the lug 30 at each free end of the band and the brake support, move the free ends of the band out of engagement with the drum. The adjustment of the jack-screws 31 determines the release position of the free ends of the band while an adjustable screw 50, carried by the link and engageable with a part of the lug 17 and locked by a lock-nut 51, determines the release position of the intermediate portion of the band.

Thus, it will be noted that in each instance the band, its anchor connections, and its association with the fluid-pressure-operated motor is the same whether the brake be used on the front or rear wheel, but when used on the front wheel the anchor pin link 20 is disposed toward the front or advanced side of the drum, while said link 20, in connection with the rear wheel, is disposed toward the rear of the advancing side of the drum so as to vary the tendency of the brake band to increase the braking force by its self-application, it being noted that there is a greater force available for braking due to self-application by arrangement of the rear wheel as distinguished from the front wheel because of the disposition of the anchor pin.

As a support for the brake cylinder 44 and the pin 23 in the construction shown in Figs. 1 to 3, inclusive, I have provided a plate 52 which is dished so as to accommodate the steering knuckle 10 and is secured by bolts 53 to a flat surface 54 on said knuckle, the brake cylinder 44 in this instance being secured to the plate 52 by bolts 55, and the pin 23 being riveted to said plate and to a lug 56 secured to said plate. Thus the brake is supported within the drum and moves with the steering knuckle 10.

In the construction shown in Figs. 5 and 6, a brake-supporting member 57 is secured to the rear axle housing 58 and the brake cylinder is secured to said support 57 by bolts 59, while the pin 23 has a bolt end 60 shouldered at 61 and provided with a nut 62 so as to clamp said pin to said support 57. An annular cover plate 63 is secured to the support 57, closing off the open end of the drum 11.

In connection with the rear wheels, it is desirable to provide means for manual brake application of such wheels in case the fluid-pressure-operated motor should fail to operate, or in case it is desired to augment the braking pressure furnished by the motor, and in Figs. 4 and 5 I have shown a shaft 64 that is journalled in the support 57 and is adapted to be oscillated by hand-lever connections, in any suitable manner, and carries a crank member 65 which is mounted within the drum and provided with diametrically spaced crank pins 66. A thrust-pin 67 is pivotally mounted on each crank pin 66 and its preferably spherically curved outer end 68 engages in a spherically curved seat 69 in the bore 70 formed in the lower part of each lug 30. To prevent any tendency of the thrust-pin 67 to rattle, a spring 71 is interposed between the washer 72 adjacent the lug 69 and a collar 73 pinned to each thrust-pin.

With this construction, since the thrust-pins 67 are on opposite sides of the center of the shaft 64, the turning of said shaft in the direction indicated by the arrow in Fig. 4 will cause said thrust-pins 67 to move outwardly and thus move the front ends of the band 16 outwardly into engagement with the drum and thus move the central portion of the band into engagement with the drum, such movement not being interfered with by the fluid-pressure-operated motor because of the thrust connections previously described associated with such motor.

I desire it to be understood that this invention is not to be limited to any particular form or arrangement of parts except in so far as such limitations are included in the claim.

What I claim as my invention is:

In a vehicle brake mechanism, the combination with a rotatable brake drum, of an internal expanding type brake engageable with said drum and provided with a lug on its free end, an abutment secured to said lug, a pivoted multiplying lever having an intermediate part in thrust engagement with said abutment, a brake cylinder having a fluid-pressure-operated thrust member associated with the free end of said lever and a manually operable thrust member mounted between said cylinder and the central portion of said drum and engageable with said lug, and means to release the brake from said drum.

In testimony whereof, I affix my signature.

NIELS A. CHRISTENSEN.